US012228341B2

(12) United States Patent
Higgins et al.

(10) Patent No.: US 12,228,341 B2
(45) Date of Patent: Feb. 18, 2025

(54) FURNACE MUFFLE FOR SINTERING A RIBBON MATERIAL

(71) Applicant: CORNING INCORPORATED, Corning, NY (US)

(72) Inventors: Brittany Lynn Higgins, Corning, NY (US); Dale Charles Marshall, Brockport, NY (US); Gary Edward Merz, Rochester, NY (US); Richard Alan Shelleman, Horseheads, NY (US); Bin Yang, Dublin, OH (US)

(73) Assignee: CORNING INCORPORATED, Corning, NY (US)

( * ) Notice: Subject to any disclaimer, the term of this patent is extended or adjusted under 35 U.S.C. 154(b) by 546 days.

(21) Appl. No.: 17/590,329

(22) Filed: Feb. 1, 2022

(65) Prior Publication Data

US 2022/0252347 A1 Aug. 11, 2022

Related U.S. Application Data

(60) Provisional application No. 63/146,232, filed on Feb. 5, 2021.

(51) Int. Cl.
*F27B 5/10* (2006.01)
*C01F 7/021* (2022.01)
*F27D 1/00* (2006.01)
*F27D 1/10* (2006.01)

(52) U.S. Cl.
CPC ............... *F27B 5/10* (2013.01); *C01F 7/021* (2013.01); *F27D 1/10* (2013.01); *F27D 2001/0063* (2013.01)

(58) Field of Classification Search
CPC .. F27B 5/10; F27B 9/082; F27B 9/084; F27B 9/086; F27B 9/088
See application file for complete search history.

(56) References Cited

U.S. PATENT DOCUMENTS

| 1,525,130 | A | * | 2/1925 | Hinsdale | F27B 9/082 |
| | | | | | 432/82 |
| 3,325,157 | A | * | 6/1967 | Cook | F27B 9/2476 |
| | | | | | 432/145 |
| 4,568,279 | A | * | 2/1986 | Logue | C21D 9/0043 |
| | | | | | 432/143 |
| 10,155,667 | B2 | * | 12/2018 | Badding | C03B 29/12 |

(Continued)

*Primary Examiner* — David J Laux
(74) *Attorney, Agent, or Firm* — Russell S. Magaziner

(57) ABSTRACT

A furnace may include a furnace muffle that can accommodate relatively larger workpieces than other furnaces. The furnace muffle may include a cover that includes one or more sets of plates. The plates may be configured to prevent sag during extended runtimes while still enabling the furnace to reach a temperature (e.g., a temperature between 1590° C. and 1650° C.) for sintering a workpiece. In some examples, the cover may include a first set of plates of a first material (e.g., a first alumina refractory material) and a second set of plates of a second material (e.g., a second alumina refractory material). The second material may have greater thermal conductivity than the first material. Accordingly, plates of the second set may be located in higher temperature zones of the furnace to enable efficient heat transfer from heater elements through the furnace muffle to a contact plate where a workpiece is heated.

20 Claims, 6 Drawing Sheets

(56) References Cited

U.S. PATENT DOCUMENTS

| | | |
|---|---|---|
| 10,581,115 B2 | 3/2020 | Badding et al. |
| 10,766,165 B2 | 9/2020 | Badding et al. |
| 2020/0399790 A1* | 12/2020 | Keller .................... D01F 9/225 |
| 2021/0184284 A1* | 6/2021 | Sojka ....................... F27B 9/06 |

* cited by examiner

FURNACE MUFFLE FOR SINTERING A RIBBON MATERIAL

CROSS REFERENCE TO RELATED APPLICATIONS

This application claims the benefit of priority under 35 U.S.C. § 119 of U.S. Provisional Application No. 63/146,232, filed on Feb. 5, 2021, the content of which is relied upon and incorporated herein by reference in its entirety.

FIELD OF TECHNOLOGY

The present disclosure relates generally to furnaces, and more specifically to a furnace muffle for sintering a workpiece, such as a ribbon material.

BACKGROUND

A furnace may be configured to heat a workpiece, such as a ribbon material, during a sintering process. For example, the workpiece may be sintered in a continuous roll to roll process through the furnace, which may be configured to operate continuously. In some cases, it may be non-trivial to scale components of a furnace to handle larger workpieces while still meeting the constraints for sintering the workpiece to yield the result desired.

SUMMARY

The methods, devices, and materials of this disclosure each have several new and innovative aspects. This summary provides some examples of these new and innovative aspects, but the disclosure may include new and innovative aspects not included in this summary.

A furnace muffle is described. The furnace muffle may include a cover configured to transfer heat from a heat source to a workpiece, where the cover comprises a first set of plates comprising a first material having a first thermal conductivity and a second set of plates including a second material having a second thermal conductivity greater than the first thermal conductivity, and where the first set of plates is positioned closer to an opening of the furnace muffle than the second set of plates, a contact plate configured to support the workpiece, and a plurality of walls configured such that the contact plate is separated from the cover by a gap between the walls.

A method is described. The method may include heating a ribbon material in a first zone of a furnace muffle using a first set of plates of a cover for transferring heat from a heat source to the ribbon material, where the first set of plates may include a first material having a first thermal conductivity, moving the ribbon material from the first zone to a second zone of the furnace muffle while a contact plate supporting the ribbon material is separated from the cover by a gap, where the gap may have a width greater than 8.5 inches between a plurality of walls, and heating the ribbon material in the second zone of the furnace muffle using a second set of plates of the cover such that a temperature of the second zone increases above about 1600 degrees Celsius, where the second set of plates may include a second material having a second thermal conductivity greater than the first thermal conductivity.

A system is described. The system may include a ribbon material and a furnace that may include a heat source that may include one or more heaters, a furnace muffle configured to transfer heat from the heat source to the ribbon material, where the furnace muffle may include, a cover comprising a first set of plates in a first zone and may include a first material and a second set of plates in a second zone and including a second material, where the first set of plates in the first zone may be positioned closer to an opening of the furnace muffle than the second set of plates in the second zone, and where the cover may be configured such that a temperature of the second zone can increase above about 1600 degrees Celsius, and a contact plate configured to support the ribbon material and separated from the cover by a gap, where a width of the gap is greater than 8.5 inches.

DETAILED DESCRIPTION

Figure 1:
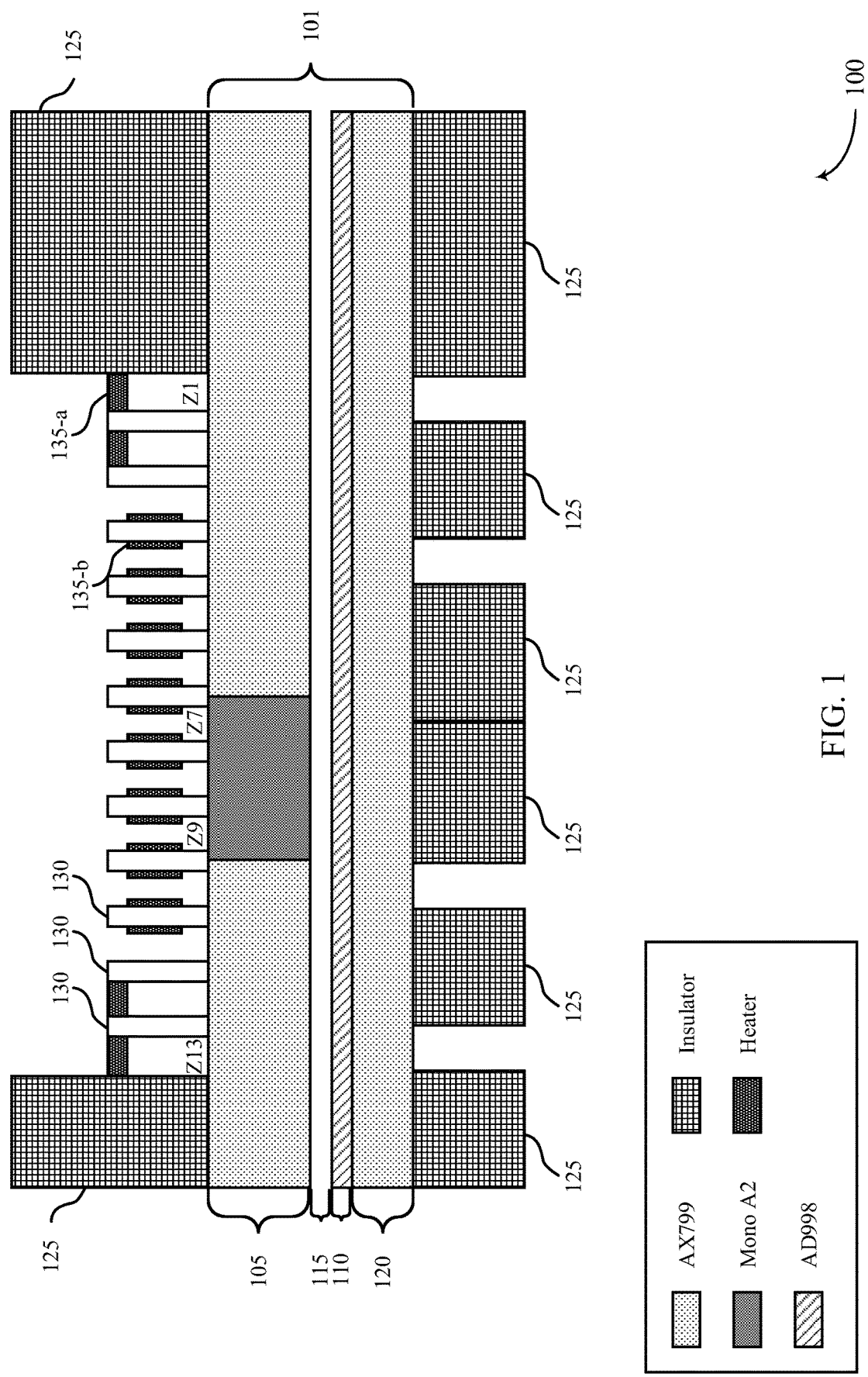
FIG. 1 illustrates an example of a system showing a furnace cross-section that includes a furnace muffle for sintering a ribbon material in accordance with aspects of the present disclosure.

A furnace may be configured to heat a workpiece, such as a ribbon material, in a sintering process. For example, alumina ribbon ceramics may be sintered at temperatures about 1600° C. using a continuous roll to roll process through a furnace, which may be configured to operate continuously for an extended duration (e.g., weeks, months, six months). In some cases, it may be beneficial to increase a size of a furnace muffle to accommodate larger workpieces that could potentially yield larger outputs. However, other different furnaces and furnace muffles may not be able to be scaled or configurable to be able to achieve such goals, and where it may be non-trivial to design a furnace muffle with refractory materials that can withstand sintering temperatures and not deform (e.g., sag or creep) over a greater span for an extended runtime duration. For example, other different furnaces may use a high-density (e.g., 99.8%) alumina tube for heating a workpiece. Alumina tubes with a greater size, however, may not be available, or may deform at relatively higher temperatures (e.g., about 1600° C.) used for sintering workpieces in some implementations, or may have other drawbacks.

According to the techniques described herein, a furnace may include a furnace muffle that is configured to accommodate larger workpieces than other different furnaces. For example, a user may wish to produce alumina ribbon materials, such as alumina ribbon materials ceramics, with widths of about 200 millimeters (mm) or about 300 mm, among other examples. The user may then process the alumina ribbon ceramics using semiconductor wafer equipment, which may in turn be configured for workpieces with widths of 200 mm or 300 mm, for workpieces with widths of 200 mm or 300 mm that have been sintered. A furnace muffle as described herein may have a width of an opening gap (e.g., greater than 8.5 inches) to enable production of alumina ribbon ceramics with the desired widths.

The furnace muffle may, in some example, include a cover that may include one or more sets of plates. The plates may be configured to reduce sag during extended runtimes, while still enabling the furnace to reach a target temperature (e.g., a temperature between 1590° C. and 1650° C., a temperature of about or at least 1600° C.) for sintering a workpiece. In some examples, the cover may include a first set of plates of a first material (e.g., an AX799 alumina refractory material or a material with similar properties) and a second set of plates of a second material (e.g., a Monofrax® A2 (Mono A2) alumina refractory material or a material with similar properties). The second material may, in some examples, have greater thermal conductivity than the first material. For example, the second material may have a thermal conductivity between 8 and 9 watts per meter Kelvin (W/m-K), and the first material may have a thermal conductivity different than (e.g., less than) 8 W/m-K. Accordingly, plates of the second set may be located in one or more relatively higher temperature zones of the furnace to enable efficient heat transfer from furnace elements (e.g., heaters) through the muffle to a contact plate where a workpiece is heated (e.g., fired). Other zones of the furnace may include plates of the first set, which may prevent or have a relatively lower thermal conduction of heat compared to the high temperature zones. These other zones, which may be relatively lower temperature zones, of the furnace may include plates of the first set positioned at relatively cooler zones that may be closer to one or both ends of the furnace (e.g., openings) compared to the one or more relatively higher temperature zones. In some examples, the first set of plates, or the second set of plates or both may be modular, providing flexibility to increase or decrease a length of one or more zones of the furnace as needed.

The features of the furnace muffles described herein may provide one or more benefits or improvements over other different furnaces and furnace muffles. For example, the modular design of the furnace muffles and furnace systems described herein may enable a relatively more linear cooldown of workpieces as the workpieces move out of the furnace compared to other different furnace muffles and furnace systems, as well as may enable improved control of heating processes inside the furnace. Thus, the workpieces may exit the furnace at a lower temperature, and the furnace may consume power more efficiently, among other benefits.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

Aspects of the disclosure are initially described in the context of a furnace system. Aspects of the disclosure are further illustrated by and described with reference to diagrams, thermal profiles, and flowcharts that relate to a furnace system and a furnace muffle for sintering a ribbon material.

FIG. 1 illustrates an example of a cross-section 100 of a furnace that includes a furnace muffle 101 for sintering a ribbon material in accordance with aspects of the present disclosure. The components illustrated in the cross-section 100 may enable improved heat transfer and temperature control in the furnace, among other benefits.

The furnace muffle 101 may include a cover 105 and a contact plate 110, where the cover 105 and the contact plate 110 may be separated by an air gap 115. The furnace muffle 101 may include a support 120 beneath the contact plate 110. In some examples, the furnace muffle 101 may include walls (not shown), such as side rails, in contact with the cover 105 or the support 120 or both, and that may be positioned beside the contact plate 110 (e.g., on one or both sides of the contact plate 110). In some examples, the walls and the support 120 may include an AX799 alumina refractory material, and the contact plate 110 may include an AD998 alumina material. In some examples, the support may include an AX799 alumina refractory material, a Mono A2 alumina refractory material, one or more other materials, or any combination thereof. In some examples, the support 120 may include a same material as one or more walls 225 and a different material as the cover 205.

The furnace may include one or more insulator components 125. The insulator components 125 may provide thermal insulation of the furnace muffle 101 to reduce heat lost (e.g., at the openings, on one or more surfaces or edges), and to thermally isolate the interior of the furnace from the surrounding environment. Additionally, the insulator components 125 may support the weight of the furnace muffle 101. In some examples, one or more insulator components 125 may include insulating firebrick. In some examples, the insulator components 125 may be positioned in contact with each, may be spaced apart from each other, or may include another material in between different insulator components 125.

In some examples, the furnace muffle 101 may include dividers 130 positioned along the length of the furnace muffle 101 to divide the furnace muffle 101 into one or more temperature zones, which may be labeled Z1, Z2, etc., where Z1 may be the temperature zone nearest to an exit opening of the furnace muffle 101 and Z13 may be the temperature zone nearest to an entrance of the furnace muffle 101. In the example illustrated in FIG. 1, the furnace includes 13 temperature zone Z1 through Z13. A respective temperature of each temperature zone may be independently or collectively (e.g., with one or more other zones) controlled using one or more heaters 135. For example, respective temperatures of zones Z1, Z2, Z12, and Z13 may be controlled using plate heaters 135-$a$, and respective temperatures of zones Z3 through Z11 may be controlled using vertical heaters 135-$b$ mounted on the top or sides (or both) of the dividers 130.

The cover 105 may be configured to transfer heat from the heaters 135 to a workpiece (e.g., a ribbon material) supported by the contact plate 110 as the workpiece moves through the furnace muffle 101. The cover 105 may include one or more sets of plates. The plates may be configured to prevent sag during extended runtimes (e.g., may sag less than a threshold distance) while still enabling the furnace to reach a temperature (e.g., a temperature between 1590° C. and 1650° C.) for sintering the workpiece. In some examples, the cover may include a first set of plates of a first material (e.g., AX799) and a second set of plates of a second material (e.g., a Mono A2 alumina refractory material). The second material may, in some examples, have a greater thermal conductivity than the first material. Accordingly, plates of the second set may be located in relatively higher temperature zones of the furnace (e.g., zones Z7, Z8, and Z9, as illustrated in FIG. 1) to enable efficient heat transfer from the heaters 135 through the cover 105 to the workpiece on the contact plate 110. Other zones of the furnace may include plates of the first set, which may prevent or have a relatively lower thermal conduction of heat from the higher temperature zones to lower temperature zones (e.g., cooler zones) at ends of the furnace (e.g., openings). In some examples, the sets of plates may be modular, with flexibility to adjust (e.g., increase or decrease) a length of the furnace, or a length of one or more zones, as desired. That is, one or more plates of a set of plates may be added or removed to adjust a length of a zone in the furnace (e.g., a relatively higher temperature zone, a relatively lower temperature zone) or the furnace.

Figure 2:
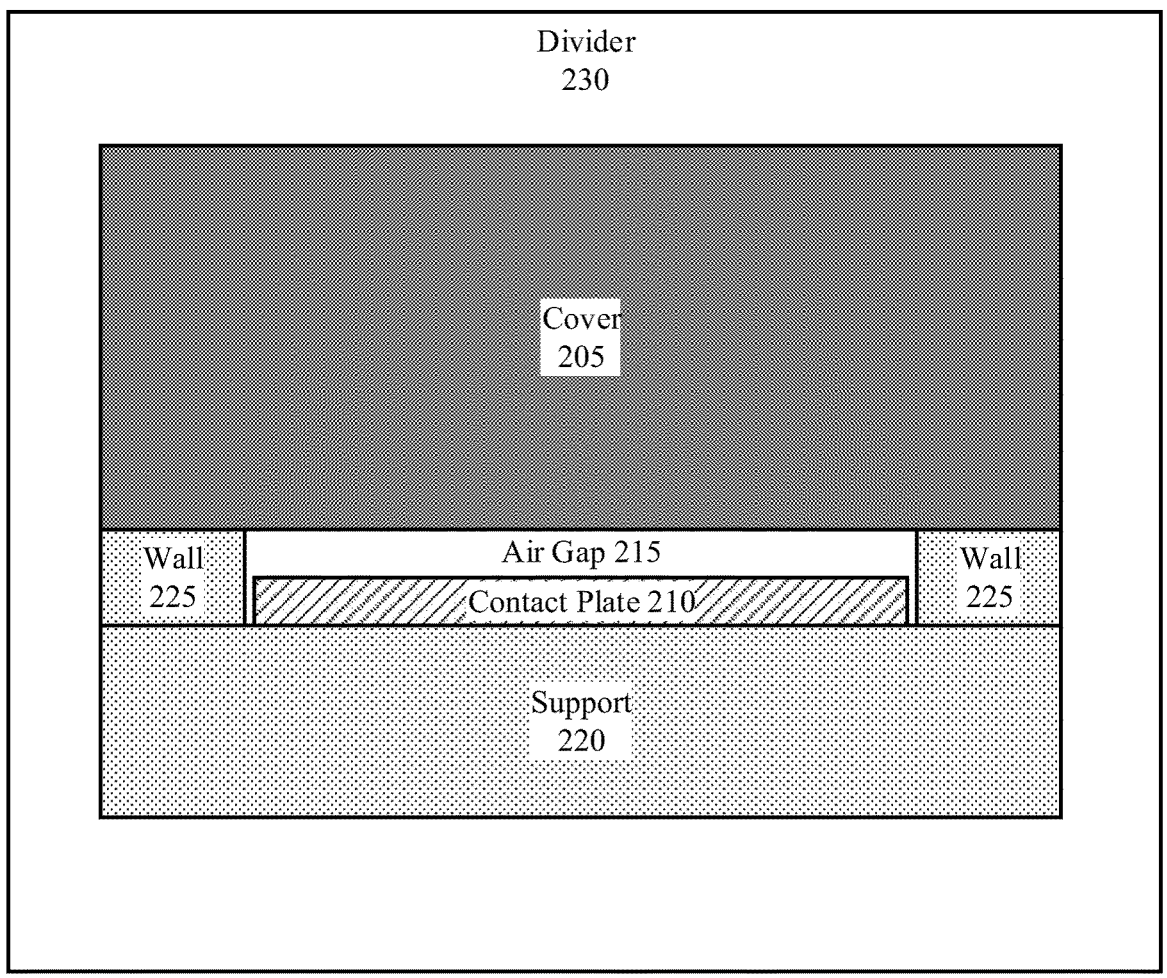
FIG. 2 illustrates an example of a cross-section of a furnace muffle for sintering a ribbon material in accordance with aspects of the present disclosure.
Figure 2:
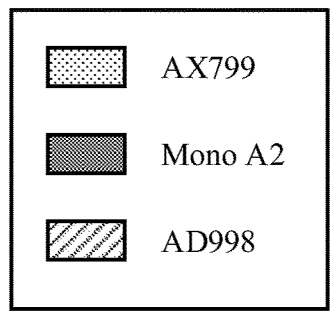

FIG. 2 illustrates an example of a cross-section 200 of a furnace muffle for sintering a ribbon material in accordance with aspects of the present disclosure. In some examples, the furnace muffle may be an example of a furnace muffle 101 described with reference to FIG. 1. The components illustrated in the cross-section 200 may enable improved heat transfer and temperature control in the furnace muffle, among other benefits.

The furnace muffle illustrated in FIG. 2 may include a cover 205 and a contact plate 210, where the cover 205 and the contact plate 210 may be separated by a gap (e.g., an air gap 215). The furnace muffle 201 may include a support 220, which may be positioned beneath the contact plate 210. In some examples, the furnace muffle 201 may include walls 225 in contact with the cover 205, or the support 220, or both. In some examples, one or more of the walls 225 may be positioned beside the contact plate 210 (e.g., in examples with multiple walls at least one wall 225 may be positioned on one side of the contact plate 210 and at least one wall 225 may be positioned on another side of the contact plate 210). In some examples, the contact plate 210 may be in contact with one or more walls 225. In some examples, the walls 225 and the support 220 may include an AX799 alumina refractory material, and the contact plate 210 may include an AD998 alumina material. In some examples, insulating firebrick (not shown) may be placed beneath the furnace muffle to provide various advantages, such as supporting the weight of the furnace muffle and insulating the furnace muffle.

In some examples, the walls 225 may be or include side rails. For example, each wall 225 may be or include a bar or plate extending from one component to another (e.g., extending from the cover 205 to the support 220) and serving as a guide, guard, or barrier. Additionally or alternatively, the walls 225 may be integral with the cover 205, or the support 220, or both. In some examples, the walls 225 may be or include blocks, pillars, shims, spacers, another refractory structure, or any combination thereof.

In some examples, the furnace muffle may include dividers 230 along the length of the furnace muffle to, among other functions, divide the furnace muffle into one or more temperature zones. The cover 205 may be configured to transfer heat from a heat source (e.g., one or more heaters) to a workpiece (e.g., a ribbon material) supported by the contact plate 210 as the workpiece moves through the temperature zones of the furnace muffle (which may be performed concurrent with heating the workpiece in one or more temperature zones of the furnace muffle). The cover 205 may include one or more sets of plates. The plates may be configured to prevent or sag during extended runtimes (e.g., may sag less than a threshold distance) while still enabling the furnace to reach a temperature (e.g., a temperature between 2590° C. and 2650° C.) for sintering the workpiece. In some examples, the cover may include a first set of plates of a first material (e.g., AX799) and a second set of plates of a second material (e.g., a Mono A2 alumina refractory material). The second material may have a greater thermal conductivity than the first material. As illustrated in FIG. 2, the cross-section 200 of the furnace muffle includes a Mono A2 plate of the furnace muffle as the cover 205 while the walls 225 and the support 220 may include AX799 material. Another cross-section (not shown) of the furnace muffle may include an AX799 plate as the cover 205. Although various materials are described in examples herein (e.g., AX799, Mono A2, AD998) the use of other materials having one or more similar properties, such as but not limited to thermal conductivity, are contemplated and are within the scope of the present disclosure.

The furnace muffle may be configured to support a width that can accommodate larger workpieces than other different furnaces without deforming (e.g., sagging, creeping) for an extended runtime (e.g., weeks, months, six months of continuous operation). In a first example, the furnace muffle may have a width of 14.75 inches, where the width may represent a width of the contact plate 210, or the width between walls 225, or both. With a width of 14.75 inches, the furnace muffle may be able to produce alumina ribbon ceramics with a width of up to about 200 mm. The furnace muffle may be configured to maintain the air gap 215 at a height, such as a height of 0.5 inches (which may be sufficient to allow for desired heating and airflow without being too large to prevent increasing to a desired sintering temperature), across the width of the furnace muffle. In some examples, the support 220 may include plates of AX799, where each plate may have a length of 15.5 inches, a width of 19.5 inches, and a height of 2 inches. In some examples, each wall 225 may be made of AX799, and may have a length of 20 inches, a width of 2.375 inches and a height of 1 inch. In some examples, the contact plate 210 may have a length of 18 inches, a width of 14.75 inches, and a height of 0.5 inches. In some examples, each plate of the cover 205 may have a length of 2 inches, a width of 19.5 inches, and height of 4 inches. In a second example, the furnace muffle may have a width of 17.75 inches, which may enable production of alumina ribbon ceramics with a width of 300 mm. The dimensions of the components of the furnace muffle may be scaled accordingly to support the width of 17.75 inches. In some examples, mating surfaces of the components of the furnace muffle may be ground flat to ensure the components fit tightly when stacked together to form the full length of the furnace muffle.

Figure 3:
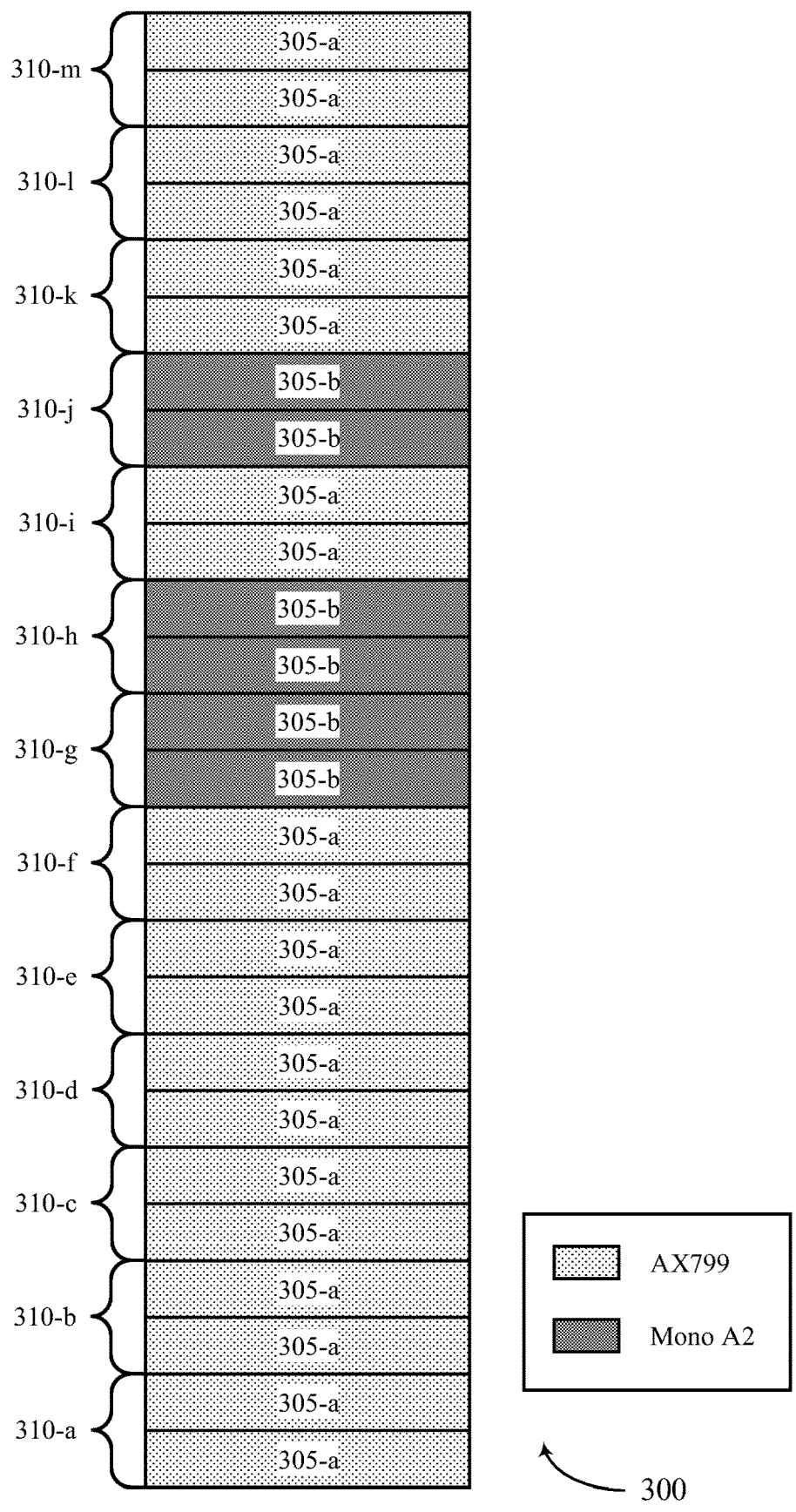
FIG. 3 illustrates an example of a cover that includes a modular design in accordance with aspects of the present disclosure.

FIG. 3 illustrates an example of a cover 300 that includes a modular design in accordance with aspects of the present disclosure. In some examples, the cover 300 may be an example of corresponding components described with reference to FIGS. 1 and 2 (e.g., cover 105, cover 205). For example, the cover 300 may be included in a furnace muffle for sintering a ribbon material.

The cover 300 may be configured to transfer heat from a heat source (e.g., one or more heaters) to a workpiece (e.g., a ribbon material) as the workpiece moves through the furnace muffle (which may be performed concurrent with heating the workpiece in one or more temperature zones of the furnace muffle). The cover 300 may include one or more sets of plates 305. The plates 305 may be configured to prevent sag during extended runtimes (e.g., may sag less than a threshold distance) while still enabling the furnace to reach a temperature (e.g., a temperature between 1590° C. and 1650° C.) for sintering the workpiece. In some examples, the cover may include a first set of plates 305-*a* of a first material (e.g., an AX799 alumina refractory material) and a second set of plates 305-*b* of a second material (e.g., a Mono A2 alumina refractory material). In some examples, the cover may have a different number of the first set of plates 305-*a* as the second set of plates 305-*a*. In some examples, the cover may have a same number of the first set of plates 305-*a* as the second set of plates 305-*a*. The second material may have a greater thermal conductivity than the first material. The plates 305 may be included in temperature zones 310, where a temperature zone 310-*a* may be nearest to an exit opening of the furnace muffle and a temperature zone 310-*m* may be nearest to an entrance opening of the furnace muffle. In some examples, a respective temperature of each temperature zone 310 may be independently controlled using one or more heaters.

In some examples, plates 305-*b* of the second set may be located in one or more relatively higher temperature zones 310 of the furnace (e.g., temperature zones 310-*g*, 310-*h*, and 310-*j*) to enable efficient heat transfer from the heaters through the cover 300 to the workpiece. Other temperature zones 310 of the furnace may include plates 305-*a* of the first set, which may prevent or have reduced thermal conduction of heat from the high temperature zones 310 to cooler temperature zones 310 at the ends of the furnace (e.g., temperature zones 310-*a*, 310-*i*, 310-*m*, among other examples). In some examples, the sets of plates 305 may be modular, with flexibility to increase or decrease a length of one or more temperature zones 310 of the furnace, or a length of a furnace, as needed. That is, one or more plates 305 may be added or removed to adjust a length of a temperature zone 310 or the furnace. For example, one or more plates 305 (e.g., 305-*b* in temperature zone 310-*j*) may be added or removed to adjust a length of a temperature zone 310 (e.g., the temperature zone from 310-*i* to 310-*m* of the furnace). As one example, two Mono A2 plates 305-*b* may be added in temperature zone 310-*j*, which may adjust a length of the zone of AX799 plates, or Mono A2 plates, or both. In some examples, one or more AX799 plates 305-*a* may be added in the temperature zone 310, such as temperature zone 310-*a*, which may adjust a length of the temperature zone 310, for example, nearest to the exit opening of the furnace muffle, or one or more AX799 plates 305-*a* may be added in the temperature zone 310, such as temperature zone 310-*m*, which may adjust a length of the temperature zone 310, for example, nearest to the entrance opening of the furnace muffle, or both.

In some examples, the plates 305 may have heights between 1 inch and 6 inches, inclusive. In experiments conducted to measure sag of the cover 300, AX799 plates 305-*a*, which were 20 inches long and 2 inches thick, with varying heights from 9.5 inches to 2 inches, were placed on refractory bricks such that a span of the plates 305-*a* would be 14.75 inches. The AX799 plates were then heated in a furnace held at 1700° C. for 7 days and the sag was measured. The results of the sag experiment can be summarized as provided in Table 1:

TABLE 1

| Plate height (inches) | Sag (micrometers (μm)) |
|---|---|
| 9.5 | 0.000 |
| 6 | 0.000 |
| 5 | 50.8 |
| 4 | 0.000 (67.7 expected) |
| 2 | 101.6 |

In the sag experiment, the 9.5 inch and 6 inch plates 305-*a* did not sag, but thermal modelling showed that the desired sintering temperature of about 1600° C. could not be reached with the 9.5 inch and 6 inch plates 305-*a*. Thermal modelling showed that with 4 inch plates 305-*a* the furnace would reach temperatures above 1600° C. and sag on the 4 inch plates 305-*a* would allow the furnace to run continuously for six months without significant deformation while meeting other size and space constraints. That is, assuming a six month furnace runtime and a sag rate of 9.7 μm per day for the 4 inch plate 305-*a*, the plates 305-*a* in the high temperature zone 310 would sag about 0.07 inches. This relatively minimal sag would not be likely affect the thermal profile of the furnace and would not impact any shape, such as a ribbon shape, of the workpiece. In some examples, due to the modular nature of the plates 305-*a*, the plates 305-*a* may be flipped 180° even after this relatively minimal sag to extend the life of the plates 305-*a*.

Figure 4:
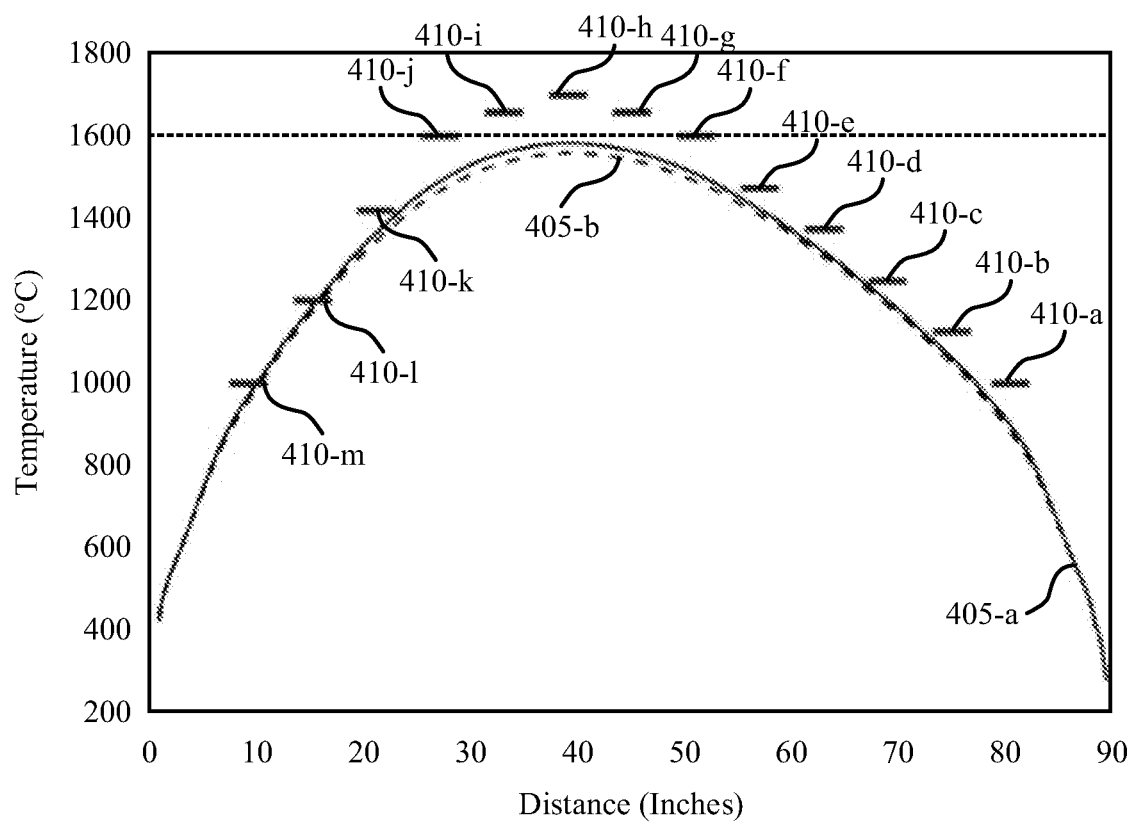
FIGS. 4 and 5 illustrate examples of thermal profiles for furnace muffles for sintering a ribbon material in accordance with aspects of the present disclosure.
Figure 4:
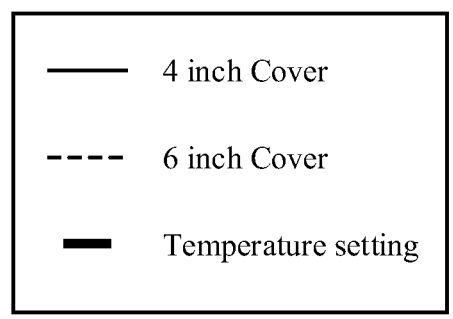

FIG. 4 illustrates an example of a thermal profile 400 for an example furnace muffle for sintering a ribbon material in accordance with aspects of the present disclosure. The thermal profile 400 may illustrate thermal models 405 for a furnace as described with reference to FIG. 1. For example, a thermal model 405-*a* may illustrate a temperature (in degrees Celsius) of a workpiece at a given distance (in inches) from an entrance of the furnace as the workpiece moves through a furnace muffle, for example, with 4 inch cover plates, and a thermal model 405-*b* may illustrate a temperature of the workpiece as the workpiece move through a furnace muffle, for example, with 6 inch cover plates.

The thermal profile 400 may illustrate respective temperature settings 410 corresponding to temperature zones of the furnace. In the example illustrated in FIG. 4, the cover plates in each temperature zone may include an AX799 alumina refractory material. The thermal model 405-*a* (which includes 4 inch cover plates) illustrates advantages over the thermal model 405-*b* (which includes 6 inch cover plates), but the relatively low thermal conductivity of the AX799 (e.g., compared to a Mono A2 refractory material) may prevent the workpiece from reaching 1600° C. in the furnace. Thus, as described herein, it may be beneficial to implement cover plates having a relatively higher thermal conductivity, such as cover plates with Mono A2 material, in the relatively high temperature zones, where Mono A2 may have a greater thermal conductivity than other materials, such as AX799.

Figure 5:
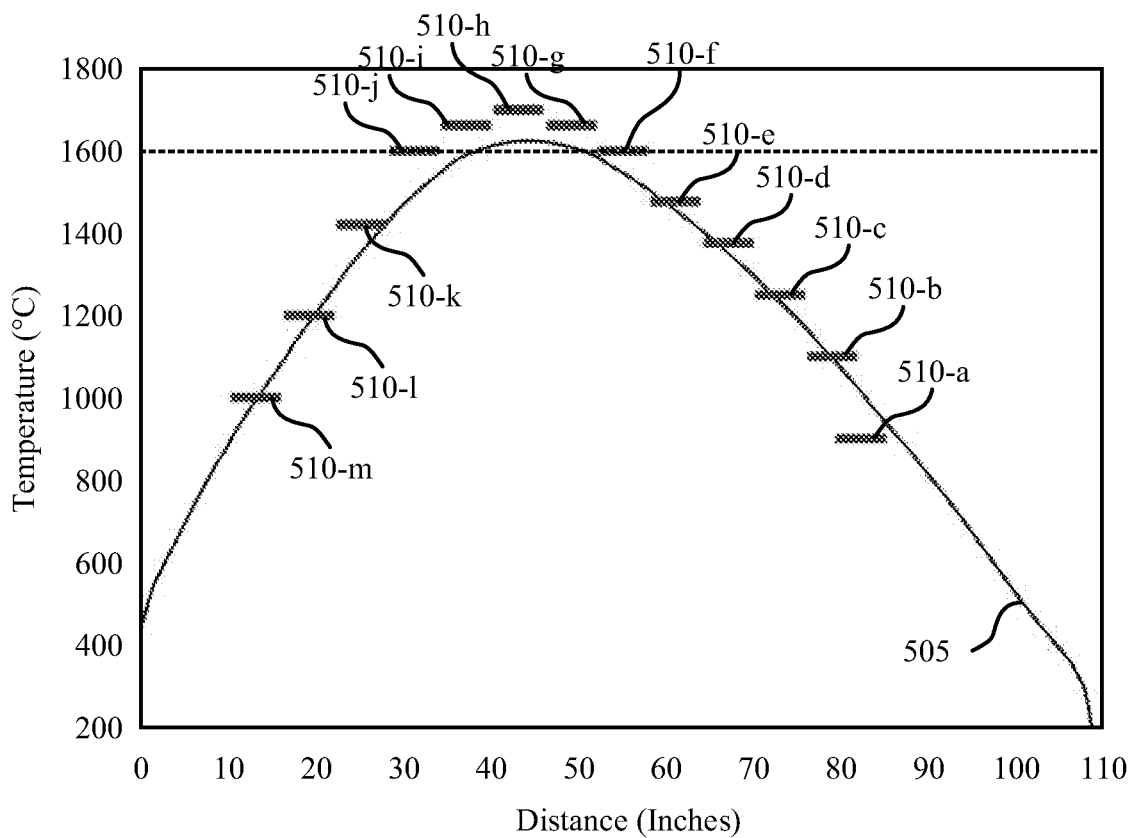
Figure 5:
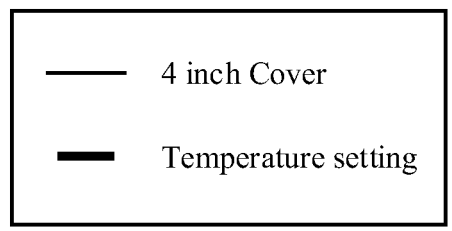

FIG. 5 illustrates an example of a thermal profile 500 for an example furnace muffle for sintering a ribbon material in accordance with aspects of the present disclosure. The thermal profile 500 may illustrate a thermal model 505 for a furnace as described with reference to FIG. 1. For example, the thermal model 505 may illustrate a temperature (in degrees Celsius) of a workpiece at a given distance (in inches) from an entrance of the furnace as the workpiece moves through a furnace muffle, for example, with 4 inch cover plates.

The thermal profile 500 may illustrate respective temperature settings 510 corresponding to temperature zones of the furnace which may be labeled Z1, Z2, etc., where Z1 may be the temperature zone nearest to an exit opening of the furnace muffle. In the example illustrated in FIG. 5, the furnace includes 13 temperature zone Z1 through Z13. The cover plates in temperature zones Z1 through Z6 and Z10 through Z13 may include an AX799 alumina refractory material, and the cover plates in temperatures zones Z7 through Z9 may include a Mono A2 alumina refractory material. The thermal model 505 illustrates that with the Mono A2 cover plates in the temperatures zones Z7 through Z9 (with corresponding temperature settings 510-*g* through 510-*i*), the temperature of the workpiece reaches 1600° C. for sintering the workpiece in the high temperatures zones Z7 through Z9, while reducing sag during extended runtimes, among other benefits. Additionally, a kink in the temperature model 505 may be pushed to a much lower temperature. A mechanical sintering model shows that pushing the kink in the temperature model 505 to a lower temperature reduces the shape of the fired workpiece (e.g., a ribbon), resulting in a flatter ribbon. This may be beneficial for both enabling winding of the ribbon onto a spool and for a final customer to process the ribbon.

Figure 6:
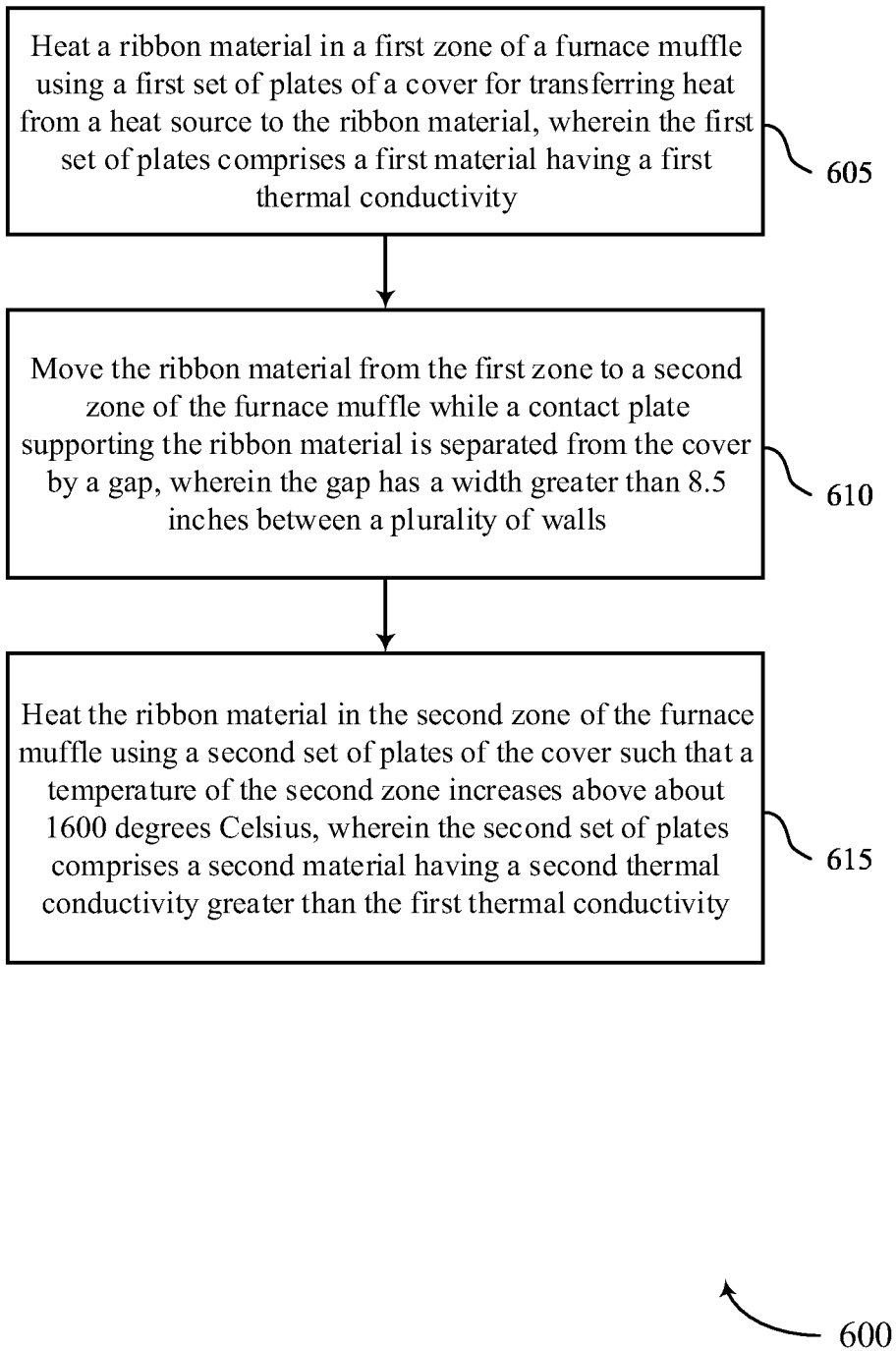
FIG. 6 shows a flowchart illustrating methods that support a furnace muffle for sintering a ribbon material in accordance with aspects of the present disclosure.

FIG. 6 shows a flowchart illustrating a method 600 that supports a furnace muffle for sintering a ribbon material in accordance with aspects of the present disclosure. The operations of the method 600 may be implemented by a furnace or its components as described herein.

At 605, the method may include heating a ribbon material in a first zone of a furnace muffle using a first set of plates of a cover for transferring heat from a heat source to the ribbon material, wherein the first set of plates comprises a first material having a first thermal conductivity. The operations of 605 may be performed in accordance with examples as disclosed herein.

At 610, the method may include moving the ribbon material from the first zone to a second zone of the furnace muffle while a contact plate supporting the ribbon material is separated from the cover by a gap, wherein the gap has a width greater than 8.5 inches between a plurality of walls. The operations of 610 may be performed in accordance with examples as disclosed herein.

At 615, the method may include heating the ribbon material in the second zone of the furnace muffle using a second set of plates of the cover such that a temperature of the second zone increases above about 1600 degrees Celsius, wherein the second set of plates comprises a second material having a second thermal conductivity greater than the first thermal conductivity. The operations of 615 may be performed in accordance with examples as disclosed herein.

In some examples, an apparatus as described herein may perform a method or methods, such as the method 600. The apparatus may include, features, circuitry, logic, means, or instructions (e.g., a non-transitory computer-readable medium storing instructions executable by a processor) for heating a ribbon material in a first zone of a furnace muffle using a first set of plates of a cover for transferring heat from a heat source to the ribbon material, wherein the first set of plates comprises a first material having a first thermal conductivity, moving the ribbon material from the first zone to a second zone of the furnace muffle while a contact plate supporting the ribbon material is separated from the cover by a gap, wherein the gap has a width greater than 8.5 inches between a plurality of walls, and heating the ribbon material in the second zone of the furnace muffle using a second set of plates of the cover such that a temperature of the second zone increases above about 1600 degrees Celsius, wherein the second set of plates comprises a second material having a second thermal conductivity greater than the first thermal conductivity.

Some examples of the method 600 and the apparatus described herein may further include operations, features, circuitry, logic, means, or instructions for heating the ribbon material in the first zone of the furnace muffle and heating the ribbon material in the second zone of the furnace muffle may be concurrent with moving the ribbon material from the first zone to the second zone.

Some examples of the method 600 and the apparatus described herein may further include operations, features, circuitry, logic, means, or instructions for moving the ribbon material from the second zone to a third zone of the furnace muffle and heating the ribbon material in the third zone of the furnace muffle using a third set of plates of the cover, wherein the third set of plates comprises the first material having the first thermal conductivity, and wherein a temperature of the third zone is less than a temperature of the second zone.

Some examples of the method 600 and the apparatus described herein may further include operations, features, circuitry, logic, means, or instructions for adding or removing one or more plates of the first set of plates, or the second set of plates, to adjust a size of the first zone, or the second zone, or both, wherein heating the ribbon material in the first zone, or the second zone, or both may be based at least in part on adding or removing the one or more plates.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

A furnace muffle is described. The furnace muffle may include a cover configured to transfer heat from a heat source to a workpiece, wherein the cover comprises a first set of plates comprising a first material having a first thermal conductivity and a second set of plates comprising a second material having a second thermal conductivity greater than the first thermal conductivity, and wherein the first set of plates is positioned closer to an opening of the furnace muffle than the second set of plates, a contact plate configured to support the workpiece, and a plurality of walls configured such that the contact plate is separated from the cover by a gap between the walls.

In some examples of the furnace muffle, a first zone of the furnace muffle comprises the first set of plates and a second zone of the furnace muffle comprises the second set of plates and the cover may be configured such that a temperature of the second zone can be above about 1600 degrees Celsius.

In some examples of the furnace muffle, at least a subset of the first set of plates, or at least a subset of the second set of plates, or both may be modular such that the subset of the first set of plates, or the subset of the second set of plates, or both can be repositioned relative to the opening of the furnace muffle.

Some examples of the furnace muffle may include a support in contact with the contact plate and the walls, wherein the support comprises the first material, or the second material, or both.

In some examples of the furnace muffle, the width of the gap between the walls may be greater than about 8.5 inches, and a height of the gap between the cover and the contact plate may be at least 0.5 inches.

In some examples of the furnace muffle, the width of the gap between the walls may be greater than about 14 inches and less than about 18 inches.

In some examples of the furnace muffle, the height of the cover may be between 1 inch and 6 inches.

In some examples of the furnace muffle, the width of the gap between the walls may be about 14.75 inches or about 17.75 inches, and the height of the cover may be about 4 inches.

In some examples of the furnace muffle, the cover further comprises a third set of plates comprising the first material, and the third set of plates may be positioned farther from the opening of the furnace muffle than the first set of plates and the second set of plates and closer to a second opening of the furnace muffle than the first set of plates and the second set of plates.

In some examples of the furnace muffle, the first material comprises an AX799 alumina refractory material, the second material comprises a Mono A2 alumina refractory material, and the workpiece comprises an alumina ribbon material.

A system is described. The system may include a ribbon material and a furnace comprising a heat source comprising one or more heaters, a furnace muffle configured to transfer heat from the heat source to the ribbon material, wherein the furnace muffle comprises, a cover comprising a first set of plates in a first zone and comprising a first material and a second set of plates in a second zone and comprising a second material, wherein the first set of plates in the first zone is positioned closer to an opening of the furnace muffle than the second set of plates in the second zone, and wherein the cover is configured such that a temperature of the second zone can increase above about 1600 degrees Celsius, and a contact plate configured to support the ribbon material and separated from the cover by a gap, wherein a width of the gap is greater than 8.5 inches.

In some examples of the system, a length of the first zone, a length of the second zone, or a length of a third zone, or any combination thereof, are adjustable based at least in part on one or more added plates or one or more removed plates of the first set of plates, of the second set of plates, or of a third set of plates in the third zone, or any combination thereof, and the third set of plates in the third zone is positioned farther from the opening of the furnace muffle than the first set of plates and the second set of plates.

In some examples of the system, the furnace muffle further comprises a plurality of walls configured such that the contact plate may be separated from the cover by the gap between the walls and a support in contact with the contact plate and the walls, wherein the support comprises one or more of the first material or the second material.

In some examples of the system, the cover may be in contact with the walls, and the support may be in contact with the walls and the contact plate such that the cover, the walls, the support, and the contact plate may be configured to maintain contact as a temperature of the furnace muffle changes.

In some examples of the system, the cover, the walls, the support, and the contact plate may be configured such that the width of the gap and a height of the gap that may be at least 0.5 inches may be maintained during thermal expansion and thermal contraction of the furnace muffle.

In some examples of the system, the first material comprises an AX799 alumina refractory material, and the second material comprises a Mono A2 alumina refractory material.

An apparatus is described. The apparatus may include a processor, memory coupled with the processor, and instructions stored in the memory. The instructions may be executable by the processor to cause the apparatus to heat a ribbon material in a first zone of a furnace muffle using a first set of plates of a cover for transferring heat from a heat source to the ribbon material, where the first set of plates may include a first material having a first thermal conductivity, move the ribbon material from the first zone to a second zone of the furnace muffle while a contact plate supporting the ribbon material is separated from the cover by a gap, where the gap may have a width greater than 8.5 inches between a plurality of walls, and heat the ribbon material in the second zone of the furnace muffle using a second set of plates of the cover such that a temperature of the second zone increases above about 1600 degrees Celsius, where the second set of plates may include a second material having a second thermal conductivity greater than the first thermal conductivity.

Another apparatus is described. The apparatus may include means for heating a ribbon material in a first zone of a furnace muffle using a first set of plates of a cover for transferring heat from a heat source to the ribbon material, where the first set of plates may include a first material having a first thermal conductivity. In some examples, the means for heating the ribbon material may be or include one or more heat sources. The apparatus may further include means for moving the ribbon material from the first zone to a second zone of the furnace muffle while a contact plate supporting the ribbon material is separated from the cover by a gap, wherein the gap has a width greater than 8.5 inches between a plurality of walls. In some examples, the means for moving the ribbon may be or include a furnace roll assembly. The apparatus may further include means for heating the ribbon material in the second zone of the furnace muffle using a second set of plates of the cover such that a temperature of the second zone increases above about 1600 degrees Celsius, where the second set of plates may include a second material having a second thermal conductivity greater than the first thermal conductivity. In some examples, the means for heating the ribbon material may be or include one or more heat sources.

The operations of the method 600 may be performed by one or more processors or other components of or associated with a furnace. In some examples, the furnace or one or more processors or other components of or associated with a furnace may execute a set of instructions to control the functional elements of to perform the described functions. Additionally or alternatively, the furnace or one or more processors or other components of or associated with a furnace may perform aspects of the described functions using special-purpose hardware.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the term "about" means that the modified characteristic (e.g., a verb or adjective modified by the term substantially) or a related aspect (e.g., related action or function), need not be absolute but is close enough to achieve the advantages of the characteristic or related aspect (e.g., related action or function).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), a central processing unit (CPU), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise random-access memory (RAM), read-only memory (ROM), electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A furnace muffle for manufacturing, comprising:
   a cover configured to transfer heat from a heat source to a workpiece, wherein the cover comprises a first set of plates comprising a first material having a first thermal conductivity and a second set of plates comprising a second material having a second thermal conductivity greater than the first thermal conductivity, and wherein the first set of plates is positioned closer to an opening of the furnace muffle than the second set of plates;
   a contact plate configured to support the workpiece; and
   a plurality of walls configured such that the contact plate is separated from the cover by a gap between the walls.

2. The furnace muffle of claim 1, wherein:
   a first zone of the furnace muffle comprises the first set of plates and a second zone of the furnace muffle comprises the second set of plates; and
   the cover is configured such that a temperature of the second zone can be above about 1600 degrees Celsius.

3. The furnace muffle of claim 1, wherein at least a subset of the first set of plates, or at least a subset of the second set of plates, or both are modular such that the subset of the first set of plates, or the subset of the second set of plates, or both can be repositioned relative to the opening of the furnace muffle.

4. The furnace muffle of claim 1, further comprising:
   a support in contact with the contact plate and the walls, wherein the support comprises the first material, or the second material, or both.

5. The furnace muffle of claim 1, wherein:
   the width of the gap between the walls is greater than about 8.5 inches; and
   a height of the gap between the cover and the contact plate is at least 0.5 inches.

6. The furnace muffle of claim 5, wherein the width of the gap between the walls is greater than about 14 inches and less than about 18 inches.

7. The furnace muffle of claim 1, wherein the height of the cover is between 1 inch and 6 inches.

8. The furnace muffle of claim 1, wherein:
   the width of the gap between the walls is about 14.75 inches or about 17.75 inches; and
   the height of the cover is about 4 inches.

9. The furnace muffle of claim 1, wherein:
the cover further comprises a third set of plates comprising the first material; and
the third set of plates is positioned farther from the opening of the furnace muffle than the first set of plates and the second set of plates and closer to a second opening of the furnace muffle than the first set of plates and the second set of plates.

10. The furnace muffle of claim 1, wherein:
the first material comprises an AX799 alumina refractory material;
the second material comprises a Mono A2 alumina refractory material; and
the workpiece comprises an alumina ribbon material.

11. A method of manufacturing, comprising:
heating a ribbon material in a first zone of a furnace muffle using a first set of plates of a cover for transferring heat from a heat source to the ribbon material, wherein the first set of plates comprises a first material having a first thermal conductivity;
moving the ribbon material from the first zone to a second zone of the furnace muffle while a contact plate supporting the ribbon material is separated from the cover by a gap, wherein the gap has a width greater than 8.5 inches between a plurality of walls; and
heating the ribbon material in the second zone of the furnace muffle using a second set of plates of the cover such that a temperature of the second zone increases above about 1600 degrees Celsius, wherein the second set of plates comprises a second material having a second thermal conductivity greater than the first thermal conductivity.

12. The method of claim 11, wherein heating the ribbon material in the first zone of the furnace muffle and heating the ribbon material in the second zone of the furnace muffle are concurrent with moving the ribbon material from the first zone to the second zone.

13. The method of claim 11, further comprising:
moving the ribbon material from the second zone to a third zone of the furnace muffle; and
heating the ribbon material in the third zone of the furnace muffle using a third set of plates of the cover, wherein the third set of plates comprises the first material having the first thermal conductivity, and wherein a temperature of the third zone is less than a temperature of the second zone.

14. The method of claim 11, further comprising:
adding or removing one or more plates of the first set of plates, or the second set of plates, to adjust a size of the first zone, or the second zone, or both, wherein heating the ribbon material in the first zone, or the second zone, or both is based at least in part on adding or removing the one or more plates.

15. A system, comprising:
a ribbon material; and
a furnace comprising:
a heat source comprising one or more heaters;
a furnace muffle configured to transfer heat from the heat source to the ribbon material, wherein the furnace muffle comprises:
a cover comprising a first set of plates in a first zone and comprising a first material and a second set of plates in a second zone and comprising a second material, wherein the first set of plates in the first zone is positioned closer to an opening of the furnace muffle than the second set of plates in the second zone, and wherein the cover is configured such that a temperature of the second zone can increase above about 1600 degrees Celsius; and
a contact plate configured to support the ribbon material and separated from the cover by a gap, wherein a width of the gap is greater than 8.5 inches.

16. The system of claim 15, wherein:
a length of the first zone, a length of the second zone, or a length of a third zone, or any combination thereof, are adjustable based at least in part on one or more added plates or one or more removed plates of the first set of plates, of the second set of plates, or of a third set of plates in the third zone, or any combination thereof; and
the third set of plates in the third zone is positioned farther from the opening of the furnace muffle than the first set of plates and the second set of plates.

17. The system of claim 15, wherein the furnace muffle further comprises:
a plurality of walls and configured such that the contact plate is separated from the cover by the gap between the walls; and
a support in contact with the contact plate and the walls, wherein the support comprises one or more of the first material or the second material.

18. The system of claim 17, wherein the cover is in contact with the walls, and the support is in contact with the walls and the contact plate such that the cover, the walls, the support, and the contact plate are configured to maintain contact as a temperature of the furnace muffle changes.

19. The system of claim 17, wherein the cover, the walls, the support, and the contact plate are configured such that the width of the gap and a height of the gap that is at least 0.5 inches are maintained during thermal expansion and thermal contraction of the furnace muffle.

20. The system of claim 15, wherein:
the first material comprises an AX799 alumina refractory material; and
the second material comprises a Mono A2 alumina refractory material.

* * * * *